Figure 1:
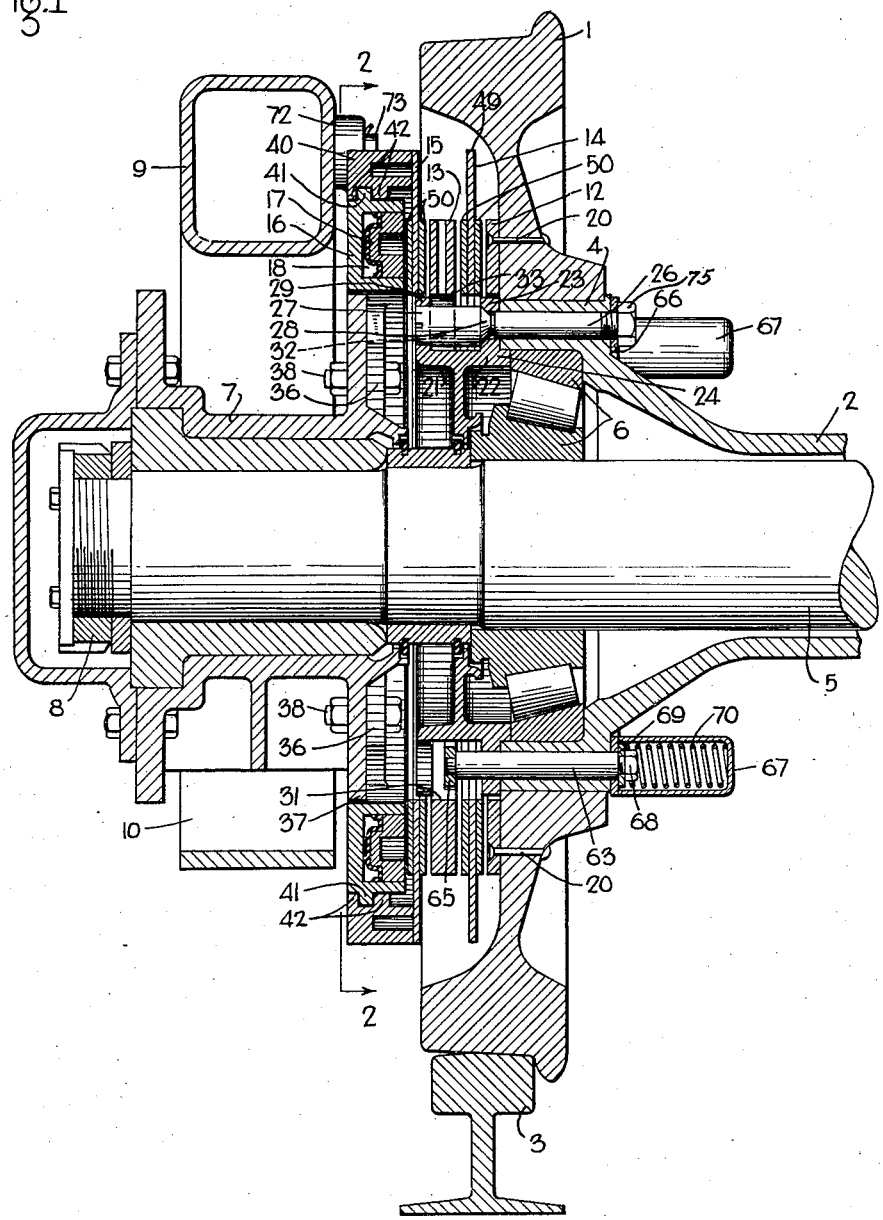

Aug. 19, 1941.   J. C. McCUNE   2,252,940
BRAKE APPARATUS FOR VEHICLES
Filed May 31, 1940   2 Sheets-Sheet 1

INVENTOR
JOSEPH C. McCUNE
BY
ATTORNEY

Aug. 19, 1941.  J. C. McCUNE  2,252,940

BRAKE APPARATUS FOR VEHICLES

Filed May 31, 1940  2 Sheets-Sheet 2

Patented Aug. 19, 1941

2,252,940

UNITED STATES PATENT OFFICE 2,252,940

BRAKE APPARATUS FOR VEHICLES

Joseph C. McCune, Edgewood, Pa., assignor to The Westinghouse Air Brake Company, Wilmerding, Pa., a corporation of Pennsylvania Application May 31, 1940, Serial No. 337,990

14 Claims. (Cl. 188—153)

This invention relates to vehicle brakes and more particularly to disk type of brake mechanism.

One object of the invention is to provide an improved disk brake mechanism particularly adapted for installation on railway vehicle trucks in a limited space such as is usually available between a wheel and side frame or journal box of such trucks.

Another object of the invention is to provide an improved disk brake mechanism in which all non-rotatable parts, including the non-rotatable brake elements or disks, are carried by the journal box and in which said disks are secured against turning by means other than the journal box so that during braking the journal box will not be subject to forces tending to twist or turn same into binding engagement with the pedestal legs of the truck frame between which the journal box is mounted.

Another object of the invention is to provide a disk brake mechanism embodying novel means for supporting the non-rotatable parts of the brake mechanism and for holding same against turning, said means having a journal supporting connection with the journal box and a torque connection with the truck frame whereby during braking the journal box will be substantially free of torque forces created in the mechanism and, as a result, the truck frame will be substantially as free for vertical movement relative to the journal box during braking as when the brakes are released.

Still another object of the invention is the provision of a disk brake mechanism embodying novel improvements with respect to compactness and simplicity of design and which is adapted to facilitate installation and maintenance.

Other objects and advantages will be apparent from the following more detailed description of the invention.

In the accompanying drawings, Fig. 1 is a vertical, sectional view of a wheel and axle assembly at one side of a vehicle truck and showing, mainly in section, the improved brake mechanism applied thereto; Fig. 2 is an end view of the brake mechanism shown in Fig. 1 taken substantially on the line 2—2 and having certain parts broken away to show a portion of the interior construction of the mechanism; Fig. 3 is a partial sectional view of certain parts of the brake mechanism taken substantially on the line 3—3 in Fig. 2; and Figs. 4 and 5 are sectional views taken on lines 4—4 and 5—5, respectively, in Fig. 2.

General description

The disk brake mechanism embodying the invention is, for the purpose of illustrating one application thereof, preferably associated with a railway vehicle truck having a wheel and axle assembly comprising two spaced wheels 1 and an axle tube 2 extending between and rigidly secured to said wheels for holding same in the usual spaced relation for rolling on rails 3. The tube 2 may be secured to each of the wheels in any desired manner but in the illustration is shown provided at the end with an annular sleeve-like end portion 4 which is pressed into an axle bore in the wheel whereby said tube is adapted to rotate with said wheel.

The reference numeral 5 indicates an axle of the wheel and axle assembly which extends through the tube 2 and which is supported at the ends of said tube by roller bearings 6 interposed between the axle and the sleeve-like portions 4 of the tube. The axle 5 extends beyond the outer face of each of the wheels 1 for supporting a journal box 7 which is journaled on the axle and secured thereon in any desired manner as by means of a nut 8 secured to the end of the axle.

The journal boxes 7 are provided for carrying a truck frame comprising the usual spaced side members 9 and transversely extending end members and transoms (not shown) which rigidly secure the side members in spaced relation. The side members are provided with the usual depending, spaced pedestal legs 10 slidably mounted in slots provided in the opposite sides of the journal boxes 7.

Only one side of one end portion of the vehicle truck frame and wheel and axle assembly above described are shown in the drawings, but in the light of the above description and due to the fact that trucks of this type are so well known the showing is deemed sufficient for a clear understanding of the invention. The improved disk brake mechanism is adapted to be associated with one or more of the wheels 1 of the truck, as will now be described.

Description of disk brake mechanism

The disk brake mechanism shown in the illustration comprises, briefly, two annular rotatable friction brake elements 12 and 13 encircling the axle 5 in the space between the wheel 1 and journal box 7 and in coaxial relation with said wheel, with the element 12 closest to the wheel. A pair of annular non-rotatable friction brake elements 14 and 15 having braking surfaces for engagement with the adjacent surfaces of the rotatable brake elements are arranged in coaxial relation therewith with the element 14 interposed between the rotatable brake elements 12 and 13 and the element 15 at the opposite side of the rotatable brake element 13.

Associated with the journal box 7 at the opposite side of the non-rotatable brake element 15 is an annular brake cylinder device 16 which comprises a casing encircling the axle 5 and having an annular chamber open through the side of the casing adjacent the non-rotatable element 15. A ring-like brake cylinder piston 17 is slidably mounted in this chamber and is open at one end to a pressure chamber 18, the opposite end of the piston 17 being arranged to engage the adjacent face of the non-rotatable brake element 15.

The pressure chamber 18 is connected to a pipe 19 (Fig. 2) through which fluid under pressure is adapted to be supplied to and released from said chamber by any desired control means. When fluid under pressure is supplied to chamber 18 such pressure acting on the piston 17 is adapted to effect movement thereof in the direction of the truck wheel 1 for thereby successively moving the nonrotatable brake element 15 into frictional engagement with the rotatable brake element 13, the element 13 into frictional contact with the non-rotatable element 14 and finally the element 14 into frictional engagement with the rotatable brake element 12 in order to effect braking of the wheel 1. The degree of such braking is dependent upon the pressure of fluid supplied to the brake cylinder pressure chamber 18 for pressing the braking elements 12 to 15 into frictional engagement and such pressure may be varied in any well known manner to provide any desired degree of braking of said wheel, as will be apparent. When fluid under pressure is released from the pressure chamber 18, means which will be hereinafter described, are adapted to operate to return the brake cylinder piston 17 and the several brake elements to their release positions shown, in which they are out of frictional contact with each other so that the wheel 1 will be free to turn.

Now in greater detail, it will be noted that the annular rotatable friction brake element 12 is rigidly secured against the outside face of wheel 1 beyond the sleeve-like portion 4 of tube 2 by means of rivets 20. Encircling the axle 5 within the several brake elements is a brake ring 21 comprising a central or cylindrical portion 22 having at the end adjacent the axle tube 2 an outstanding annular flange 23 the outside diameter of which is at least equal to that of the annular portion 4 of said tube. Extending beyond the outer end surface of the flange 23 is a cylindrical portion 24 of reduced diameter which slidably fits within the annular sleeve-like portion 4 of tube 2 and which bears against the outer race of roller bearing 6 for holding same in place.

The brake ring 21 is rigidly secured to the outer end of the sleeve-like portion 4 of the axle tube and thereby to wheel 1, by means of a plurality of bolts 26 which are equally spaced from each other around the axle 5. Each of the bolts 26 extends through a suitable bore in the sleeve-like portion 4 of the tube 2 and an aligned bore in the flange 23 of the brake ring 21 and beyond said flange each bolt has a portion 27 of enlarged diameter which is connected to the smaller portion by a tapered part 28. The outer end of the bore in flange 23 through which each of the bolts extend is also slightly tapered for engagement by the tapered part 28 on the bolt so that when a nut 75 provided on each bolt at the opposite side of the wheel is tightened the flange 23 and thereby the brake ring 21 will be rigidly drawn against the sleeve-like portion 4 of the axle tube 2 and then held against movement relative to the wheel 1.

Projecting radially outwardly from the outer end of the cylindrical portion 22 of the brake ring 21 are a plurality of spaced ears or lugs 29 corresponding in number and spacing to the bolts 26. Each of these lugs has a bore in which the outer end of the enlarged portion 27 of one of the bolts 26 is disposed, the purpose of these ears being to support the enlarged portions 27 of the bolts 26 against bending at the annular flange 23 during braking, at which time braking force applied to the rotatable brake element 13 is transmitted through the several enlarged portions 27 of the bolts 26 to the truck wheel 1.

The annular rotatable brake element 13 has an inside peripheral surface 31 which is of greater diameter than that over the ears 29, and extending inwardly from this surface are a plurality of driving ears 32 corresponding in number and spacing to bolts 26. A radial slot 33 is provided in each of the ears 32 to fit over or to receive the enlarged portions 27 of the bolts 26 thereby providing a driving connection between the rotatable brake element 13 and wheel 1. From Fig. 2 it will be noted that there is clearance between the bottom of each of the slots 33 and the respective bolt 26, this being provided to allow free expansion and contraction of the rotatable brake element in case such occurs during alternate heating and cooling thereof incident to braking.

The inner ends of the ears 32 are so formed as to freely pass through the spaces between the lugs 29 provided on the outer end of the brake ring 21. By this arrangement the rotatable brake element 13 may be slipped over the lugs or ears 29 on the brake ring 22 to the space between said ears and the flange 23 as shown, after which it may be turned relative to said brake ring so that the slots 33 will line up with the bores through said lugs. The bolts 26 may be then inserted into place through the lugs 29, slots 33 and through the several bores in the flange 23 at the opposite end of the brake ring 21. By this novel arrangement it is possible to make the lugs 29 on the outer end of the brake ring 21 integral therewith thereby not only obtaining a strong structure but also eliminating the need for securing means, such as bolts or the like which are liable to become loose and drop out of place. Such possibility of failure is however obviated by the invention as is desirable in connection with brake mechanism.

The casing of the brake cylinder device 16 is provided with a plurality of inwardly extending lugs 36 mounted against a flange 37 on the inner end of the journal box 7 and rigidly secured thereto by bolts 38. An annular torque ring 40 is mounted to turn on the outer peripheral surface of the brake cylinder device 16 and in its working position shown is secured against axial movement relative to the brake cylinder device by the interengagement of a tooth 41 provided at both the top and bottom of the brake cylinder device as viewed in Fig. 1, with a pair of teeth 42 provided at both the top and bottom of the torque ring 40.

At each of the opposite sides of axle 5 the torque ring 40 has at the end adjacent wheel 1 an inwardly extending shoulder 43 and at each of the opposite sides of the brake cylinder device there is provided at its inner end an outwardly extending shoulder 44 for engagement with the shoulder 43. The teeth 41 and 42 and the shoulders 44 and 43 on the brake cylinder device and torque ring, respectively, are of a length less than one quarter of the perimeter of the surfaces on which they are formed, and this structure is provided for the purpose of assembling the torque ring on the brake cylinder device to its working position and for securing same against axial movement relative to the brake cylinder device, without the need for bolts or the like.

In order to mount the torque ring 40 on the brake cylinder device it is adapted to be arranged at the left hand side of the brake cylinder device, as viewed in Fig. 1, with the teeth 42 on said ring in axial alignment with the teeth 41 on the brake cylinder device. With the teeth 41 and 42 thus positioned, the shoulders 43 on the torque ring are lined up to pass through the spaces between the teeth 41 on the brake cylinder device and the torque ring is then pushed over the brake cylinder device until the inner teeth 42 on the ring engage the teeth 41 on the brake cylinder device. In this position the shoulders 43 on the torque ring will be in substantial engagement with the shoulders 44 on the brake cylinder device and so positioned with respect to the teeth 41 on the brake cylinder device that the torque ring may be turned relative thereto. The torque ring is then turned relative to the brake cylinder device through an arc of substantially 90° to a position in which the teeth 42 on the ring are arranged to pass through the spaces between the teeth 41 on the brake cylinder device while the shoulders 43 on the ring are arranged to pass through the spaces between the shoulders 44 on the brake cylinder device. The ring is then pushed over the brake cylinder device further to a position in which the inner teeth 42 on the ring engage the shoulders 44 on the brake cylinder device and then the ring is turned back relative to the brake cylinder device to its original position as shown in Figs. 1 and 2, it being noted that during this turning movement the teeth 41 on the brake cylinder device enter the spaces between the teeth 42 on the ring, while the shoulders 43 on the ring are turned into alignment with the shoulders 44 on the brake cylinder device thereby providing a support for the ring against axial movement throughout substantially its full length, it being noted however that the ring is free to turn on the brake cylinder device when in its working condition just described.

The torque ring 40 is provided for carrying the non-rotatable brake elements 14 and 15 and for holding same against rotation during braking. To accomplish this the torque ring is provided with a plurality of lugs 46 extending outwardly therefrom in the direction of the wheel 1 and slidably mounted in each of these lugs and extending through a pocket 47 open at the opposite side of the ring is a bolt 48.

Each of the non-rotatable brake elements 14 and 15 comprises an annular backing plate 49 of a diameter exceeding the distance between oppositely arranged bolts 48 and on each of the opposite sides of both of these backing plates there is secured a ring-like friction element 50 made of any desired friction braking material such as cast iron, and of the same inside and outside diameters as the rotatable brake elements 12 and 13.

The bolts 48 extend through suitable openings in backing plate 49 of the non-rotatable brake element 14 for supporting same and each of said bolts has a head 52 engaging the face of said element adjacent the wheel. A head 53 is provided on the opposite end of each bolt 48 and is adapted to move into and out of the pocket 47, and interposed between each of said heads and the bottom wall of the respective pocket 47 is a spring 54, the several springs 54 acting through bolts 48 for urging the non-rotatable brake element 14 to its release position shown and defined by engagement of the backing plate 49 with the ends of the lugs 46, as shown in Fig. 4.

The backing plate 49 of the non-rotatable brake element 15 is provided around its periphery with a plurality of slots so arranged as to fit over the several lugs 46 (Fig. 2) and to be slidable thereon in the direction of their length. Engagement between the backing plate 49 of the brake element 15 and the torque ring 40 is adapted to define the release position of said brake element in which position it is shown in the drawings. For moving the non-rotatable brake element 15 to its release position, a plurality of release springs 56 are arranged in pockets 57 in the torque ring which open at the face of the ring opposite the wheel 1. Each of the springs 56 acts on a head 58 of a bolt 59 which extends through an aperture in the bottom of the respective pocket 57 and an aligned opening in the backing plate 49 of the brake element and which has a head 60 engaging said backing plate on the face opposite the brake cylinder device. It will thus be apparent that the several release springs 56 acting through the bolts 59 at all times urge the non-rotatable brake element 15 to its release position, just described.

For urging the rotatable brake element 13 to its release position shown and defined by engagement of the driving ears 32 thereon with the lugs 29 provided on the brake ring 21 there is provided around the axle 2 in alternate relation with the torque bolts 26 a plurality of release pins 63 which are mounted to slide in suitably aligned bores provided through the sleeve-like portion 4 of the axle tube 2 and the flange 23 of the brake ring 21. The pins 63 being thus located, are lined up with the spaces between the lugs 29 extending from the brake ring 21, so in order to provide an operating connection between each of said pins and the lugs 32 on the rotatable brake element 13 there is secured to the end of each pin 63 a bridging element 65 extending across the space between the adjacent driving lugs 32 and engaging said lugs preferably within suitably arranged pockets.

Secured against the inner end of the sleeve portion 4 of axle 2 by the torque bolts 26 is a ring 66 which is provided over the end of each of the release pins 63 with a spring cage 67 the inner end of which is open and welded to the ring 66 over the release pin 63 which extends into the cage, while the outer end of the cage is preferably closed. Secured by a nut 68 to the end of the release pin 63 in each spring cage 67 is a spring seat 69 and interposed between this seat and the closed end of the spring cage is a release spring 70 which is under compression. Each spring cage 67 may be open at one side for assembly of the nut 68, spring seat 69 and spring 70. It will be apparent that the several release springs 70 at all times act through the release pins 63 and the bridging elements 65 urging the rotatable brake element 13 to its release position shown.

When the brake cylinder piston 17 is actuated by fluid under pressure to move the several brake elements into frictional interengagement to effect braking of the truck wheel 1 it will be apparent that such movement of the non-rotatable elements 15 and 14 is opposed by the several release springs 56 and 54, respectively, while the movement of the rotatable brake element 13 is opposed by the several release springs 70. It will be further noted that upon the release of fluid under pressure from chamber 18 in the brake cylinder device these several springs will return the respective brake elements to their release positions in which the truck wheel 1 is free to rotate.

When the brakes are applied it will be noted that the release springs for the non-rotatable brake elements act to pull the torque ring 40 relative to the brake cylinder device in the direction of the truck wheel 1 but such axial movement is prevented due to the interengagement of the teeth 41 and 42 and shoulders 44 and 43 on the brake cylinder device and torque ring, respectively. Such force as may be thus applied to the torque ring is however relatively small but it should be noted that said ring is supported throughout substantially its full circumferential length against distortion due to same.

It will be noted that when the brakes on the wheel 1 are applied the non-rotatable brake elements 14 and 15 and thereby the torque ring 40 will tend to turn with the rotatable brake elements 12 and 13. To hold the torque ring 40 and thereby the non-rotatable brake elements 14 and 15 against such turning said ring is provided at one side with an outwardly extending arm 71 to the outer end of which is connected one end of a vertically extending link 72 having its opposite end mounted on a pin 73 secured to the side frame 9 of the truck. The truck side frame 9 will thus hold the non-rotatable elements against turning when braking and since the torque ring 40 is free to turn on the brake cylinder device 16 the journal box 7 will not be subject to torque incident to braking and as a result will not become bound between the pedestal legs 10 of the side frame during braking.

As is well known the vertical position of a truck frame with respect to the truck wheels varies according to the degree of load in the vehicle supported by said frame. In the illustration the truck side frame 9 may therefore at one time occupy a position such as shown and at other times be either a greater or less distance from the axle 5 and as will be apparent the torque ring 40 is adapted to accommodate itself to the vertical position of the truck frame with respect to the truck wheels since it is free to turn on and relative to the brake cylinder device 16. The degree of such turning will however be relatively small for the full range of movement of the truck side frame 9 relative to the truck wheel 1 so that the interlocking teeth and shoulders on the torque ring and brake cylinder device will be maintained in sufficient interlocking contact at all times to securely hold said ring in the proper working relation with respect to the brake cylinder device.

*Assembling of disk brake mechanism to a vehicle truck*

The brake mechanism is adapted to be applied to the truck during assembly thereof, that is, before the journal box 7 is mounted on the axle 2 and before the truck frame is mounted on the journal box.

In assembling the brake mechanism, the rotatable brake element 12 is first secured in place against the outside face of the wheel 1. The release pins 63 carrying the bridging elements 65 are then mounted in flange 23 of the brake ring 21 following which the rotatable brake element 13 is mounted over the lugs 29 on the brake ring 21 and turned to the position in which the slots 33 in the ears 32 line up with the oppositely arranged bores in the lugs 29 and flange 23 at opposite ends of the brake ring. The several torque bolts 26 are then applied to the brake ring 21, this operation securing the rotatable brake element 13 to said ring. The non-rotatable brake element 14 is then slipped over the torque bolts 26 to its working position and this assembly of parts and the ring 66 are then applied and rigidly secured to the sleeve portion 4 of the axle tube 2. The springs 70, seats 69 therefor and nuts 68 may next be assembled in the spring cages 67.

The brake cylinder device 16 is then secured to the journal box flange 37 by bolts 38 and the torque ring 40 is mounted on said brake cylinder device either before or after this operation, as desired, and in the manner hereinbefore described. The non-rotatable brake element 15 is next slipped onto the lugs 46 and connected to the release bolts 59 therefor.

After the above assemblies of parts are completed, the journal box 7 may be applied to the end of axle 5 to its working position following which the non-rotatable brake element 14 may be connected up with the release pins 48 carried by the lugs 46 projecting from the torque ring 40. The truck frame 9 is then mounted on the journal box 7 and the link 72 is applied to connect the torque ring to the side frame. The brake mechanism is now ready for use.

*Summary*

It will now be apparent that the improved brake mechanism is relatively simple. It has a minimum of parts accomplished by the use of novel arrangements for assembling of the parts and for holding same in their working positions and due to which maximum resistance to distortion of the parts is obtained to thereby provide long life and to reduce to a minimum the possibility of loss of parts in use and a consequent possible failure of the mechanism. It is also important to note that while the non-rotatable parts of the brake mechanism are carried by the journal box the novel assembling arrangement of the torque ring on the brake cylinder device not only eliminates the need of conventional securing means such as bolts but also provides a journal-like arrangement whereby braking torque may be transferred to the truck frame. By this arrangement the journal box will be substantially free of torque forces incident to braking and will not become twisted and bound between the pedestal legs 10 of the truck side frame during braking.

While only one illustrative embodiment of the invention has been described in detail, it is not the intention to limit it to that embodiment or otherwise than by the terms of the appended claims.

Having now described my invention, what I claim as new and desire to secure by Letters Patent, is:

1. A disk brake mechanism for a wheel and axle assembly of a railway vehicle truck, comprising, an annular rotatable friction brake element secured to rotate with said assembly in coaxial relation therewith, an annular non-rotatable friction brake element adapted to frictionally engage said rotatable element to effect braking of said assembly, an annular brake cylinder device arranged in coaxial relation to said brake elements and operative to effect frictional interengagement between said brake elements, means secured against radial movement relative to said assembly for carrying said brake cylinder device, support means carried by said brake cylinder device and adapted to turn relative to said brake cylinder device about its axis and carrying said non-rotatable element, and a member connecting said support means to a portion of the truck for holding same and thereby said non-rotatable element against rotation with said rotatable element.

2. A disk brake mechanism for a wheel and axle assembly of a railway vehicle truck having a journal box mounted on said axle, said mechanism comprising an annular rotatable friction brake element secured to rotate with said assembly in coaxial relation therewith, an annular non-rotatable friction brake element adapted to frictionally engage said rotatable brake element to effect braking of said assembly, an annular brake cylinder device arranged in coaxial relation to said brake elements and rigidly secured to said journal box and operative to effect frictional braking engagement between said brake elements, means journaled on said brake cylinder device carrying said non-rotatable brake element, and means connecting the journaled means to a portion of said truck other than said journal box for holding said journaled means and thereby said non-rotatable brake element against rotation.

3. A disk brake mechanism for a wheel and axle assembly of a railway vehicle truck, comprising, an annular rotatable friction brake element secured to rotate with said assembly in coaxial relation therewith, an annular non-rotatable friction brake element adapted to frictionally engage said rotatable element to effect braking of said assembly, an annular brake cylinder device arranged in coaxial relation to said brake elements and operative to effect frictional engagement between said brake elements, means supporting said brake cylinder device against radial movement relative to said assembly, a torque ring carrying said non-rotatable element and journaled on said brake cylinder device and operative to hold said non-rotatable element against rotation, a member connecting said torque ring with a portion of said truck for securing said torque ring against rotation, and interlocking means on said brake cylinder device and torque ring securing said ring against axial movement relative to said brake cylinder device and providing for movement of said ring relative to said brake cylinder device circumferentially thereof.

4. A disk brake mechanism for a wheel and axle assembly of a railway vehicle truck, comprising, an annular rotatable friction brake element secured to rotate with said assembly in coaxial relation therewith, an annular non-rotatable friction brake element adapted to frictionally engage said rotatable element to effect braking of said assembly, an annular brake cylinder device arranged in coaxial relation to said brake elements and operative to effect frictional engagement between said brake elements, means supporting said brake cylinder device against radial movement relative to said assembly, a torque ring carrying said non-rotatable element and journaled on said brake cylinder device and operative to hold said non-rotatable element against rotation, a member connecting said torque ring with a portion of said truck for securing said torque ring against rotation, and interlocking means formed integral with said torque ring and brake cylinder device providing for circumferential movement of said ring relative to said brake cylinder device and effective in a certain circumferential relation between said ring and brake cylinder device to secure said ring against axial movement relative to said brake cylinder device, said interlocking means upon rotation of said ring relative to said brake cylinder device out of said relation providing for movement of said ring axially of said brake cylinder device.

5. A disk brake mechanism for a wheel and axle assembly of a railway vehicle truck, comprising, an annular rotatable friction brake element secured to rotate with said assembly in coaxial relation therewith, an annular non-rotatable friction brake element adapted to frictionally engage said rotatable element to effect braking of said assembly, an annular brake cylinder device arranged in coaxial relation to said brake elements and operative to effect frictional engagement between said brake elements, means supporting said brake cylinder device against radial movement relative to said assembly, a torque ring carrying said non-rotatable element and journaled on said brake cylinder device and operative to hold said non-rotatable element against rotation, a member connecting said torque ring with a portion of said truck for securing said torque ring against rotation, said brake cylinder device and ring having interlocking teeth formed circumferentially thereof for a portion of their length to secure said ring against axial movement relative to said brake cylinder device in the normal working condition of said ring with respect to said brake cylinder device and providing for movement of said ring circumferentially of said brake cylinder device, the teeth on said ring upon a chosen degree of rotation relative to brake cylinder device being adapted to move out of interlocking relation with the teeth on said brake cylinder device to provide for axial movement of said ring relative to said brake cylinder device for separating said ring and brake cylinder device from each other.

6. A disk brake mechanism for a wheel and axle assembly of a railway vehicle truck, comprising, an annular rotatable friction brake element secured to rotate with said assembly in coaxial relation therewith, an annular non-rotatable friction brake element adapted to frictionally engage said rotatable element to effect braking of said assembly, an annular brake cylinder device arranged in coaxial relation to said brake elements and operative to effect frictional engagement between said brake elements, an annular torque ring encircling and mounted to turn on said brake cylinder device carrying said non-rotatable brake element and operative to hold same against rotation with said rotatable brake element, a member connecting said ring with a portion of said truck for securing same and thereby said non-rotatable element against rotation, and means operative in the working position of said ring with respect to said brake cylinder device for securing said ring against axial movement relative to said brake cylinder device but providing for circumferential movement of said ring, said means comprising a tongue and groove connection between said brake cylinder device and ring effective in the working position of said ring and ineffective upon rotation of said ring relative to said brake cylinder device through an arc of a chosen length to provide for separation of said ring and brake cylinder device from each other.

7. A disk brake mechanism for a wheel and axle assembly of a railway vehicle truck, comprising, an annular rotatable friction brake element secured to rotate with said assembly in coaxial relation therewith, an annular non-rotatable friction brake element adapted to frictionally engage said rotatable element to effect braking of said assembly, an annular brake cylinder device disposed in coaxial relation to said brake elements and operative to actuate said non-rotatable brake element, a ring encircling and arranged to turn on the outer peripheral surface of said brake cylinder device, said ring supporting said non-rotatable brake element against rotation with said rotatable brake element, means providing a connection between said ring and a portion of said truck for securing said ring against rotation, said brake cylinder device having a plurality of circumferentially extending teeth projecting from the outer periphery thereof and equally spaced apart, said teeth being of a length less than the length of the spaces between adjacent ends of the teeth, said ring having teeth coacting with those on said brake cylinder device for securing said ring against axial movement relative to said brake cylinder device but providing for circumferential movement of said ring with respect to said brake cylinder device, the teeth on said ring being of substantially the same length as those on said brake cylinder device whereby rotation of said ring relative to said brake cylinder device through an arc equal in length to at least the length of the teeth will position the teeth on said ring in line with the spaces between the teeth of said brake cylinder device to provide for application of said ring to said brake cylinder device or removal of said ring from said brake cylinder device.

8. A disk brake mechanism for a wheel and axle assembly of a railway vehicle truck, comprising, an annular rotatable friction brake element secured to rotate with said assembly in coaxial relation therewith, an annular non-rotatable friction brake element adapted to frictionally engage said rotatable element to effect braking of said assembly, an annular brake cylinder device disposed in coaxial relation to said brake elements and operative to actuate said non-rotatable brake element, a ring encircling and arranged to turn on the outer peripheral surface of said brake cylinder device, said ring supporting said non-rotatable brake element against rotation with said rotatable brake element, means providing a connection between said ring and a portion of said truck for securing said ring against rotation, said ring having a plurality of circumferentially extending teeth projecting from the inner periphery thereof and equally spaced apart, said teeth being of a length less than the length of the spaces between adjacent ends of the teeth, said ring also having at one end a plurality of circumferentially extending teeth equally spaced apart and of a length no greater than the spaces between the ends of said teeth and having at the opposite end and in line with said spaces a plurality of spaced shoulders, said brake cylinder device having at one end shoulders for engaging the inner surfaces of the said shoulders on said ring and having intermediate its ends a plurality of teeth of substantially the same length and arranged to engage the inner surfaces of the said teeth on said ring when said ring is in its normal working position on the brake cylinder device, said ring upon rotation relative to said brake cylinder device through an arc equal in length to the length of said spaces being adapted to release the teeth on said ring from those on said brake cylinder device to provide for axial movement of said ring relative to said brake cylinder device limited by engagement of the shoulders on said ring with the teeth on said brake cylinder device and then upon reverse rotation of the ring to the same extent providing for further axial movement of said ring relative to said braking cylinder device for separating one from the other.

9. A disk brake mechanism for a wheel and axle assembly of a railway vehicle truck having a journal box mounted on said axle and a truck side frame mounted on said journal box and movable vertically relative thereto, said brake mechanism comprising an annular rotatable friction brake element encircling said axle and secured to rotate with said wheel in coaxial relation therewith, an annular non-rotatable friction brake element adapted to frictionally engage said rotatable brake element for braking said wheel, an annular brake cylinder device arranged in coaxial relation with said brake elements and operative to actuate said non-rotatable brake element, means rigidly securing said brake cylinder device to said journal box, an annular torque ring encircling and having a journal-like connection with said brake cylinder device providing for turning movement of said ring relative to said brake cylinder device, means carried by said ring supporting said non-rotatable brake element, and means connecting said ring to said side frame for holding same and thereby said non-rotatable brake element against rotation.

10. A disk brake mechanism for a wheel and axle assembly of a railway vehicle truck having a journal box mounted on said axle, said mechanism comprising an annular rotatable friction brake element encircling said axle and secured to rotate with said wheel in coaxial relation therewith, an annular non-rotatable friction brake element disposed in coaxial relation with said rotatable brake element and adapted to be moved into frictional braking engagement therewith for braking said wheel, an annular brake cylinder device encircling said axle and rigidly secured to said journal box in coaxial relation with said brake elements and operative to actuate said non-rotatable brake element, a torque ring encircling and carried by said brake cylinder device and adapted to turn thereon, means carried by said ring supporting said non-rotatable brake element against turning relative to said ring, release means carried by said ring operative on said non-rotatable element to move same out of frictional contact with said rotatable element, means securing said ring against axial movement relative to said brake cylinder device, and means connecting said ring to a portion of said truck other than said journal box for holding said ring and non-rotatable element against turning with said rotatable brake element.

11. A disk brake mechanism for a wheel and axle assembly of a railway vehicle truck, comprising, a brake ring disposed in coaxial relation to said assembly and having a central cylindrical portion and an annular outstanding flange at one end of said cylindrical portion engaging one end face of said wheel, a plurality of bolts spaced apart around said axle and extending through said flange and wheel rigidly securing said brake ring to said wheel, each of said bolts having an extended portion disposed adjacent the outer peripheral face of said cylindrical portion and extending parallel to the axis thereof, said ring having an integral part extending from the opposite end of the cylindrical portion thereof rigidly supporting the ends of the extended portions of said bolts, an annular rotatable brake element encircling the extended portions of said bolts and having openings through which the extended portions of said bolts project, the extended portions of said bolts engaging the side walls of said openings to provide a driving connection between said wheel and rotatable brake element, an annular non-rotatable friction brake element adapted to frictionally engage said rotatable brake element for effecting braking of said wheel, and a brake cylinder device for actuating said non-rotatable brake element.

12. A disk brake mechanism for a wheel and axle assembly of a railway vehicle truck, comprising, a brake ring encircling said axle in coaxial relation therewith and having a central cylindrical portion and at one end thereof an outstanding annular flange and at the opposite end a plurality of outstanding ears equally spaced apart, each of said ears having a bore aligned with a bore of smaller diameter in said flange, an annular rotatable friction brake element having an inside diameter of such dimension as to provide for movement thereof over said ears and having inwardly extending lugs adapted to pass through the spaces between the ears on said brake ring, each of said lugs having an opening adapted to be aligned with a pair of aligned bores in one of said ears and the flange of the said brake ring, torque bolts having an enlarged portion one end of each of which is supported in the bore in one of said ears, the enlarged portion of each bolt extending through the aligned opening in said brake element and engaging the inner surface of said flange, each of said bolts having a portion of reduced diameter projecting from the opposite face of said flange through a bore in said assembly and rigidly secured to said assembly for supporting said brake ring and rotatable brake element for rotation with said assembly, an annular non-rotatable friction brake element arranged to frictionally engage said rotatable brake element for braking said wheel, an annular brake cylinder device arranged in coaxial relation with said brake elements for actuating said non-rotatable brake element, means supporting said brake cylinder device and non-rotatable brake element in cooperative relation with said rotatable brake element, and means connected to said non-rotatable brake element securing same against rotation with said rotatable brake element.

13. A disk brake mechanism for a wheel and axle assembly of a railway vehicle truck having a journal box mounted on said axle, said brake mechanism comprising an equal number of annular rotatable and non-rotatable friction brake elements interleaved with each other and arranged in coaxial relation with said assembly and with the outermost rotatable brake element secured to said assembly against axial movement and for rotation with said assembly, an annular brake ring encircled by said brake elements and comprising a cylindrical portion having at one end an outstanding annular flange and at the opposite end a plurality of outstanding ears arranged circumferentially thereof and equally spaced from each other, each of said ears having a bore aligned with a bore in said flange, a plurality of bolts arranged around said assembly and bearing against the inner face of said flange and secured to said assembly for rigidly securing said brake ring to said assembly for rotation therewith, each of said bolts having a portion extending across the outer face of said cylindrical portion parallel to the axis thereof and supported at its end in the bore in one of said ears, the rotatable brake element disposed between the two non-rotatable brake elements having an inside diameter no less than the diameter of a circle enclosing said ears and having inwardly extending lugs corresponding in number and disposition to the ears on said brake ring and arranged to pass through the spaces between the ears on said brake ring, said lugs being aligned with said ears and each having a slot in which the extended portion of a torque bolt is disposed to thereby provide driving engagement between the rotatable brake element and brake ring and thereby with said wheel, an annular brake cylinder device disposed adjacent the outer face of the outermost of the two non-rotatable brake elements for actuating the several brake elements into frictional engagement to effect braking of said wheel, means rigidly securing said brake cylinder device to said journal box, an annular torque ring having a journal-like support connection with said brake cylinder device providing for movement of said torque ring in a direction around said brake cylinder device, means carried by said torque ring supporting said non-rotatable brake elements and providing for movement thereof in the direction of said rotatable brake elements, means carried by said ring acting on said non-rotatable brake elements for effecting movement thereof out of frictional engagement wtih said rotatable brake elements, spring actuated means carried by said assembly and acting on the rotatable brake element interposed between the two nonrotatable brake elements for positioning the same out of contact with said non-rotatable brake elements, means securing said torque ring against axial movement relative to said brake cylinder device, and means connecting said torque ring to a portion of said truck other than said journal box for holding same and thereby said non-operable brake elements against rotation with said rotatable brake elements.

14. A disk brake mechanism for a wheel and axle assembly of a railway vehicle truck, comprising, a brake ring encircling said axle in coaxial relation therewith and having a central cylindrical portion and at one end thereof an outstanding annular flange and at the opposite end a plurality of outstanding ears equally spaced apart, each of said ears having a bore aligned with a bore in said flange, an annular rotatable friction brake element having an inside diameter of such dimension as to permit movement thereof over said ears and having inwardly extending lugs adapted to pass through the spaces between said ears, each of said lugs having an opening adapted to be aligned with a pair of aligned bores in one of said ears and in said flange of said brake ring, torque bolts spaced apart around said axle and extending through the bores in said flange and through said wheel rigidly securing said brake ring to said wheel, each of said bolts having an extended portion supported at its end in the aligned bore in one of said ears and extending through the opening in one of said lugs to provide driving engagement between said rotatable brake element and said wheel, an annular non-rotatable friction brake element for frictionally engaging said rotatable brake element for braking said assembly, a brake cylinder device for moving the rotatable brake element into engagement with said non-rotatable brake element, and release means acting on said rotatable brake element for moving same out of engagement with said non-rotatable element, said release means comprising a plurality of pins each of which is slidably mounted in said assembly in line with the space provided between two adjacent ears of said brake ring, a bridge-like member engaged by one end of each of said pins and extending between and engaging two adjacent lugs on said rotatable brake element, and a spring acting on each of said pins and through the bridge-like member at the one end thereof on said rotatable brake element urging same to its release position.

JOSEPH C. McCUNE.

DISCLAIMER 2,252,940.—*Joseph C. McCune*, Edgewood, Pa. BRAKE APPARATUS FOR VEHICLES.
Patent dated August 19, 1941. Disclaimer filed May 29, 1943, by the inventor; the assignee, *The Westinghouse Air Brake Company*, consenting.

Hereby enters this disclaimer to claims 11 and 12 of said patent.

[*Official Gazette June 15, 1943.*]